July 14, 1953  F. C. GRANADE ET AL  2,645,162
COMPOUND BORE CUTTING MACHINE
Filed April 26, 1950  2 Sheets-Sheet 2
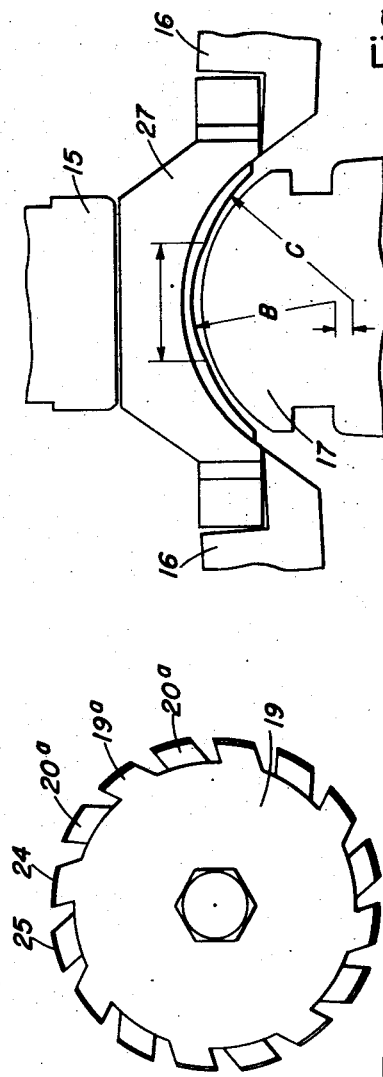
INVENTORS
George H. A. Ruby
Fred C. Granade
BY
Charles F. Kaegele
ATTORNEY Patented July 14, 1953

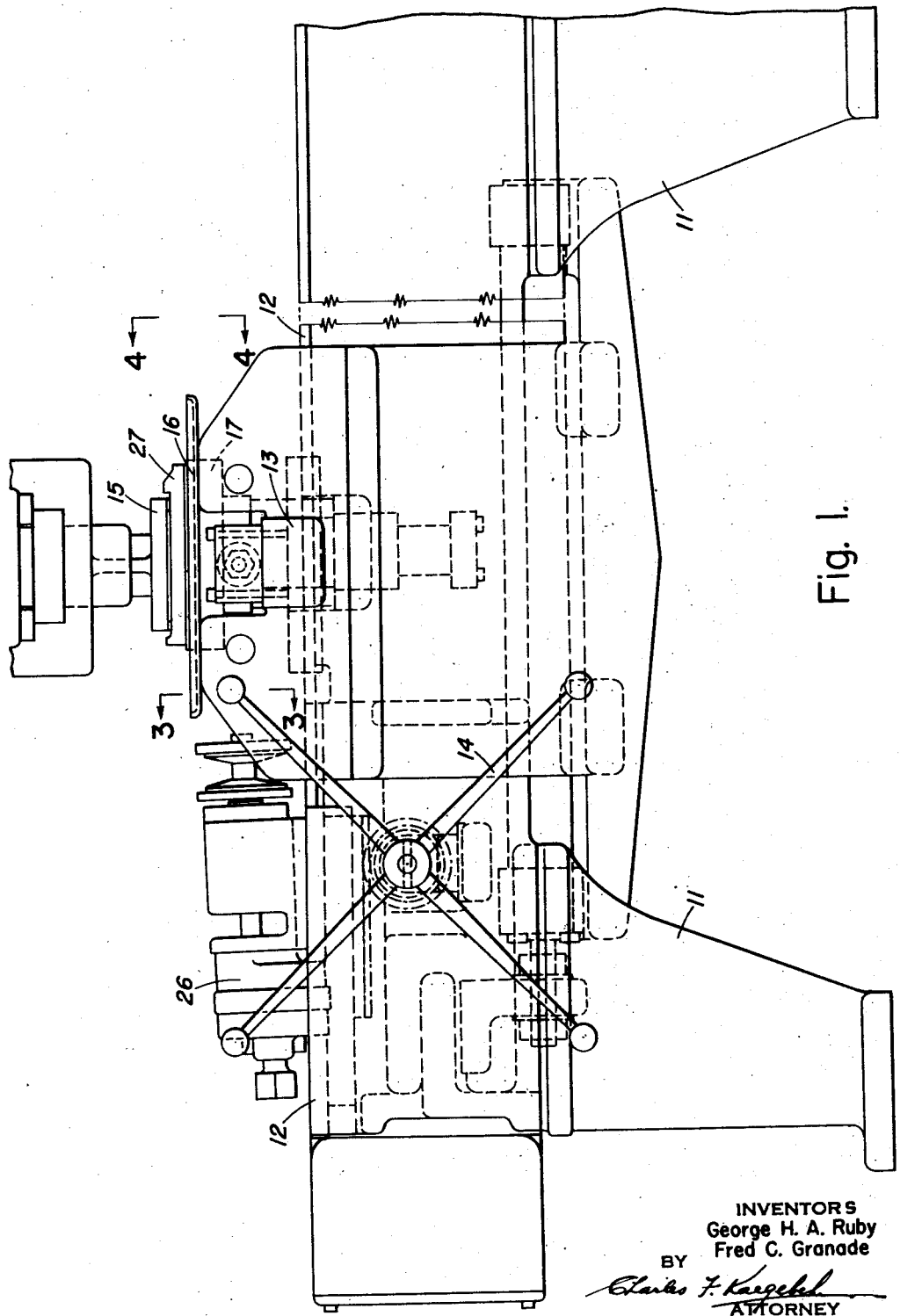

2,645,162

UNITED STATES PATENT OFFICE 2,645,162

COMPOUND BORE CUTTING MACHINE

Fred C. Granade and George H. A. Ruby, Chicago, Ill., assignors to National Lead Company, New York, N. Y., a corporation of New Jersey Application April 26, 1950, Serial No. 158,182

3 Claims. (Cl. 90—18)

This invention relates to a machine tool for broaching bearings and more particularly for broaching bearings to form what is known in the art as a "compound bore."

Bearings with a compound bore are characterized having the inner bearing surface provided with a centrally located shallow arcuate indentation. The indentation is shaped as the arc of a circle of slightly less radius than the radius of the bearing surfaces adjacent to it on either side. Such a compound bore bearing is considered to be more adaptable for use with new as well as partially worn shafts providing a better fit than conventional circular broached bearings. Broaching or machining the inner bearing surface to form a compound bore has heretofore been an expensive and time-consuming operation. This has involved operating the machine, which is of conventional type, to form the standard bore, that is, a circular surface, and then replacing the cutting wheel with one of less diameter and either elevating the cutter or depressing the bearing appropriately and taking another cut to form the central indentation.

This invention, therefore, has for its object provision of a cutting tool which will permit broaching a bearing to form a compound bore in one operation. Another object of this invention is to provide a cutting tool which will broach a compound bore more precisely, more uniformly and more economically than has heretofore been possible. These and other objects of the invention will be apparent from the following more complete description thereof and from the annexed drawings in which:

Fig. 1 illustrates a conventional machine equipped with the novel cutting tool of this invention.

Fig. 2 illustrates in more detail the cutting tool.

Fig. 3 illustrates an end view of the cutting wheel assembly.

Fig. 4 illustrates the compound type of bearing bore produced.

Referring now particularly to Fig. 1, the broaching machine comprises a base 11 on which are mounted parallel ways or support guides 12. Slidably mounted on the ways 12 is carriage 13 which carries the mechanism for clamping a bearing block in proper alignment. The carriage 13 travels along the ways 12 actuated by suitable and conventional means such as a fluid cylinder controlled by 14. The carriage is equipped with a top clamp 15 and side clamps 16 to hold the bearing firmly in position parallel to the ways of the machine as shown in some detail in Fig. 4. Saddle 17 may be employed as a vertical positioner to locate the bearing vertically while clamping on the carriage and this element is removed or slid out from under the bearing surface before the broaching operation is commenced.

The cutting tool comprises a cutter head 18 which is equipped with a plurality, for instance, a pair of spaced-apart, coaxially mounted cutting wheels 19 and 20. Wheel 19 mounted at the extremity of shaft 21 has a radius slightly less than the radius of wheel 20, as shown in the end view in Fig. 3, wherein are shown the cutting teeth 19a and 20a respectively of each wheel. The shaft 21, on which the cutter head is fixedly attached is supported by a suitable bearing 22 which is in turn provided with mounting 23, to support and maintain this element in fixed relation to the ways 12 of the machine. The bearing and mounting, considered the bearing mounting, is designed so that the shaft 21 and the central axis of the cutter head will not be parallel to the plane of the ways 12 but will be at a slight vertical angle thereto. The angle A shown in Fig. 2 is an exaggerated illustration of the angle between the plane of the ways and the axis of the shaft and cutter head. The angle A is of such magnitude as to elevate the top edge of cutter wheel 19 above the top edge of cutter wheel 20 as shown, also exaggerated in Fig. 2. The outer edges 24 and 25 respectively on the teeth 19a and 20a are preferably not parallel to the axis of the cutter head but the wheels 19 and 20 are tapered through their thickness so that the edges 24 and 25 at the top of the wheels are parallel to the ways 12 of the machine. The taper of wheels 19 and 20 will depend on the angle A of the cutter head axis to the plane of the ways. The shaft 21 is rotated by suitable driving means such as fluid motor 26.

In operation of the device of this invention a bearing 27 to be broached or bored is placed in position gauged by saddle 15 and firmly clamped by clamps 15 and 16. The cutter head being rotated by motor 26 the carriage carrying the bearing is moved along the ways 12 so that the bearing surface is machined to compound bore form by the action of cutter wheels 19 and 20. An end view of the bearing surface produced, exaggerated, appears in Fig. 4, where the central indentation is shown having an approximate arc of radius B impressed in conventional bore of radius C. It will be observed that due to the cutter head angle, the bore sections will not be true arcs of circles corresponding to the cutter wheel perimeters, but will be slightly elliptical. This variation is very slight and does not affect the operation of the bearing and in no way detracts from the usefulness of the device. It is in fact so slight that in actual work cannot be observed or measured and can only be computed mathematically.

It is to be understood that while the embodiment illustrated shows a machine in which the cutter head is maintained in stationary position, the bearing to be machined being movable in its carriage, substantially identical results, though it may not be as convenient or economical, may be obtained by mounting the bearing stationary and mounting the cutter assembly on a movable carriage so long as the relative angles of the axis of the cutting wheels and the longitudinal bearing surface is maintained. In addition, the angle between the cutter head axis and the ways of the machine has been exaggerated in the drawings for clarity and in actual practice this angle will be very small since the depth of the central indentation in the bearing surface will be of the order only of a few thousandths of an inch.

While this invention has been described and illustrated with reference to an embodiment shown in the drawings, it is not intended to be strictly limited thereto and other modifications and variations may be employed within the scope of the following claims:

We claim:

1. In a bearing broaching machine having a base and ways mounted thereon a cutting tool comprising a shaft, a plurality of spaced apart cutting wheels fixedly mounted on said shaft, one of said cutting wheels being of less diameter than the others of said wheels, and a bearing mounting supporting said shaft at such an angle to the plane of the ways of said machine that the top edge of the wheel of lesser diameter will project above the top edge of any other of said wheels, whereby said cutting tool will produce a compound bore in said bearing in a single cutting operation.

2. In a bearing broaching machine having a base and ways mounted thereon a cutting tool comprising a shaft, a pair of spaced-apart cutting wheels fixedly mounted on said shaft one of said cutting wheels being of less diameter than the other of said wheels, and a bearing mounting supporting said shaft at such an angle to the plane of the ways of said machine that the top edge of the wheel of lesser diameter will project above the top edge of the wheel of greater diameter, whereby said cutting tool will produce a compound bore in said bearing in a single cutting operation.

3. In a bearing broaching machine having a base and ways mounted thereon a cutting tool comprising a shaft, a plurality of spaced-apart tapered cutting wheels fixedly mounted on said shaft one of said cutting wheels being of less diameter than the others of said wheels, and a bearing mounting supporting said shaft at such an angle to the plane of the ways of said machine that the top edge of the wheel of lesser diameter will project above the top edge of any other of said wheels, the top edge surfaces of said tapered wheels being parallel to the plane of the ways of said machine.

FRED C. GRANADE.
GEORGE H. A. RUBY.

References Cited in the file of this patent

UNITED STATES PATENTS

| Number | Name | Date |
|---|---|---|
| 1,225,113 | Davie | May 18, 1917 |
| 2,496,379 | Cox | Feb. 7, 1950 |

FOREIGN PATENTS

| Number | Country | Date |
|---|---|---|
| 128,889 | Germany | Mar. 21, 1902 |